May 28, 1968  E. DECKER  3,385,214

TWO BODY FUZING SYSTEM

Filed Sept. 1, 1965  3 Sheets-Sheet 1

INVENTOR.
EDWIN DECKER
BY

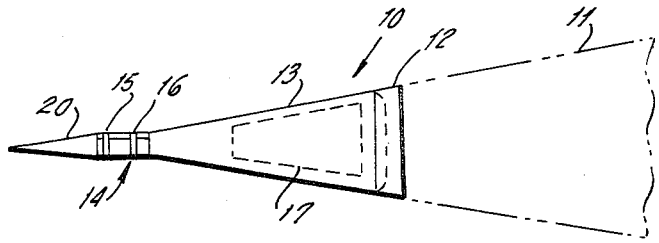
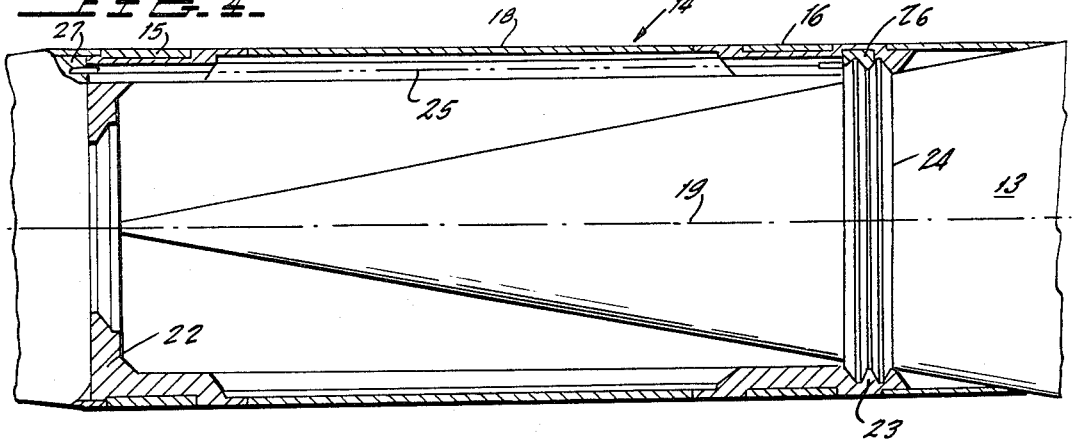
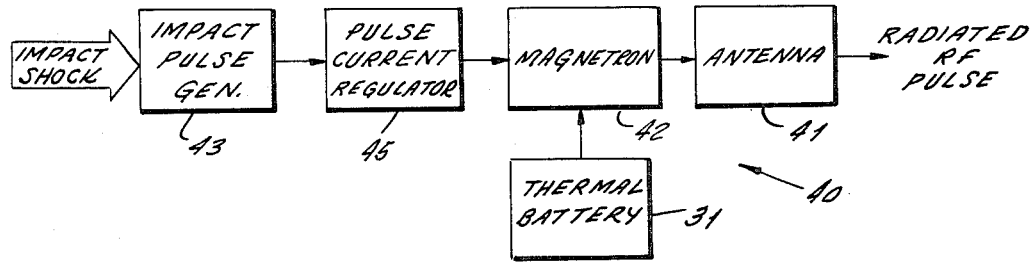
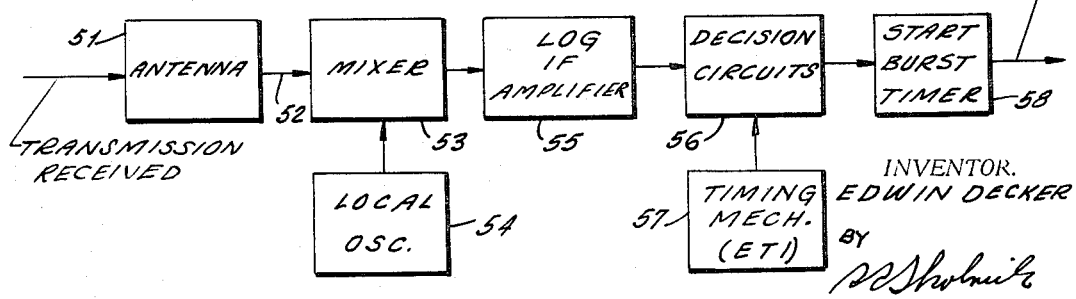

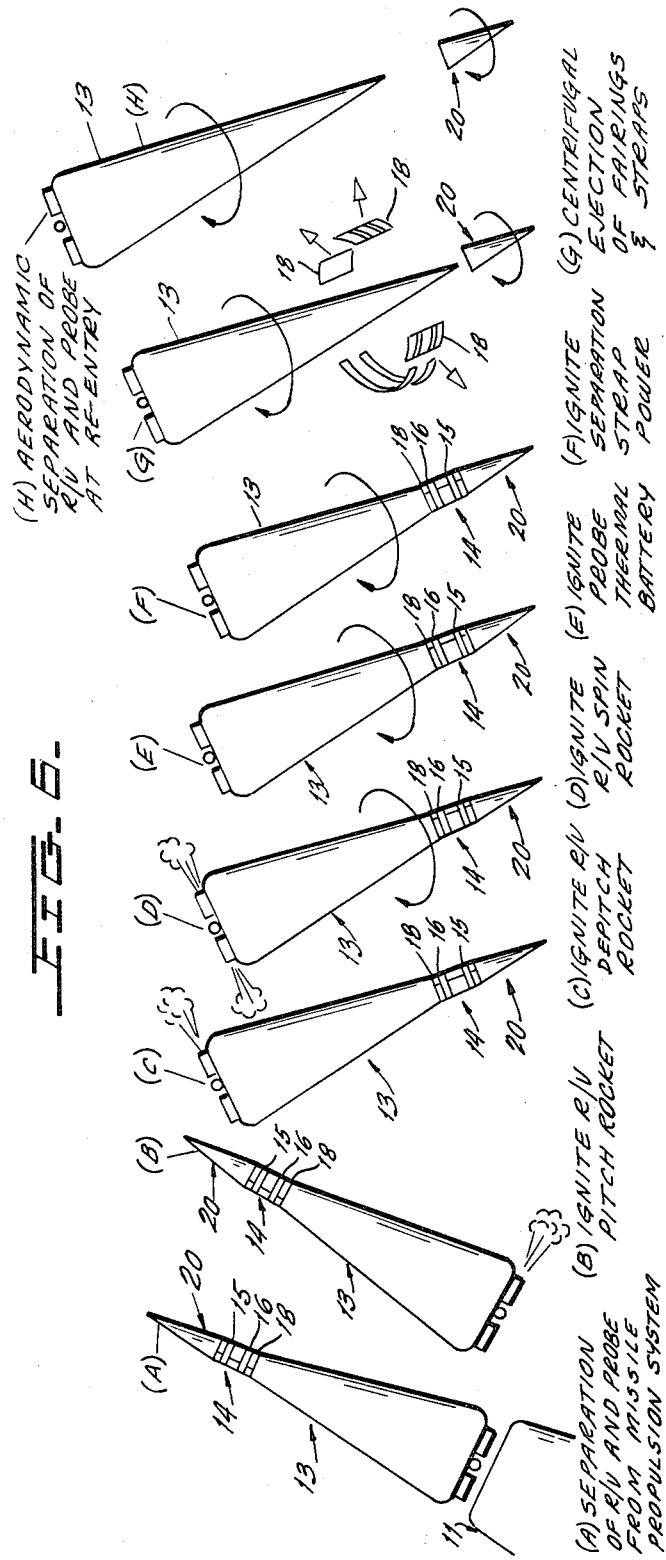
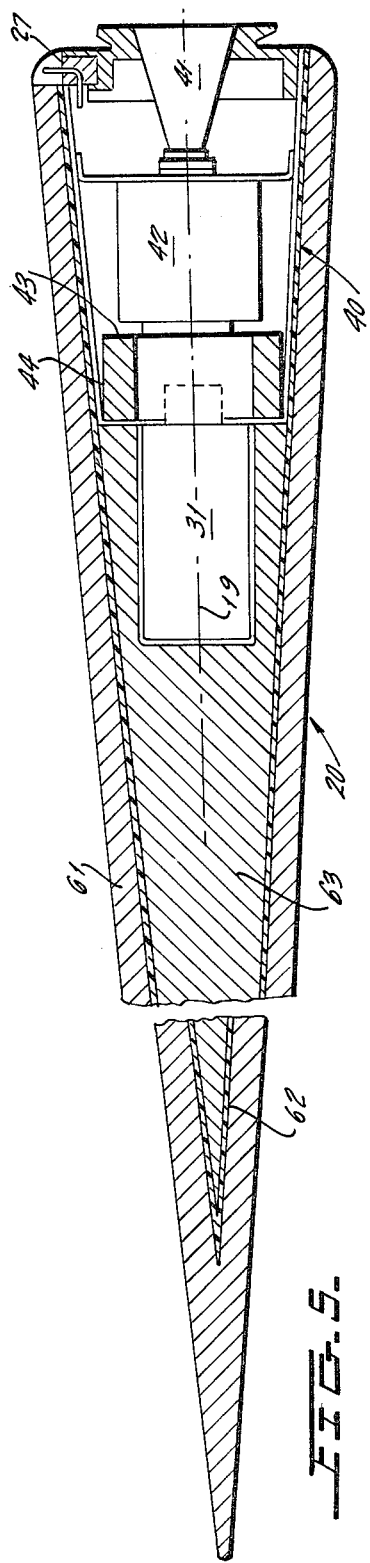

United States Patent Office 3,385,214
Patented May 28, 1968

3,385,214
TWO BODY FUZING SYSTEM
Edwin Decker, East Meadow, N.Y., assignor to Sperry Rand Corporation, Ford Instrument Company Division, Long Island City, N.Y., a corporation of Delaware
Filed Sept. 1, 1965, Ser. No. 484,279
9 Claims. (Cl. 102—70.2)

In general this invention relates to means for air burst fuzing of a missile warhead and more particularly relates to means of this type utilizing differential altitude measurement means to assure that accuracy is maintained and penetrability is assured.

There is an increasing demand for accuracy and penetrability in air burst fuzing of high performance reentry missiles. Systems presently developed are limited in their ability to combine the required height of burst accuracy to assure maximum weapon effectiveness and the required counter measures immunities to survive and penetrate a sophisticated defense system. That is, various inertial fuzing systems are essentially jam proof insofar as counter measures are concerned. However, inertial systems are dependent upon trajectory predictability so that only moderate accuracies can be achieved in the presence of random trajectory variations. A terrain clearance active radiation system, such as radar, finds application when high height of burst accuracy is dictated by over pressure or ground contamination considerations. In active radiation systems, effectiveness is limited because of susceptibility to jamming as by electronic counter measures. It has been found that under conditions of high reentry velocities barometric fuzes do not achieve sufficient accuracy.

In order to overcome these disadvantages of the prior art the instant invention provides a novel fuzing system which derives a terrain-referenced altitude measurement by sensing the impact of a small reentry body or probe. This combines the terrain clearance and height of burst accuracy attributes of a radar fuzing device while at the same time having high resistance to electronic counter measures as in inertial fuzing devices.

Briefly, the device of the instant invention is incorporated in a missile having a reentry vehicle containing a warhead and a second body designated as a probe removably secured to the reentry vehicle. The purpose of the probe is to establish an aboslute altitude reference point during reentry with this purpose being achieved by releasing the probe from the reentry vehicle during an initial downward trajectory phase, some time after final propulsion stage cut-off, typically just prior to reentry. Since the probe is given a negligible release differential velocity, prior to reentry the probe and reentry vehicles remain in close proximity to each other. However, during reentry, the probe, due to its specifically designed greater ballistic coefficient than that of the reentry vehicle, is subjected to a lesser atmospheric drag and because of this will precede the reentry vehicle as both fall toward the earth. At the time of probe ground impact, the probe transmits a short duration signal to the reentry vehicle with this signal being received by the reentry vehicle when it is above the desirable burst altitude. Upon receipt of the probe impact signal a timing device in the reentry vehicle is set in operation to provide the proper firing signal which occurs when the reentry vehicle is at the desired burst altitude.

Altitude separation between the probe and reentry vehicle during the reentry phase is predictable with considerably greater accuracy than is the absolute altitude of a single body in the presence of random atmospheric variations and booster guidance and control system errors. This point may be illustrated by considering a reentry case of two identical vehicles reentering a non-standard atmosphere on the same trajectory. Since all flight environmental perturbations will affect the trajectories of both bodies equally, no change will occur in the position of one relative to the other even though the positions of both relative to the earth will be disturbed. In the instant situation both the probe and the reentry vehicle will experience virtually the same perturbations at very nearly the same time so that the effects upon each will be substantially the same.

Since the fuzing function of interest is the altitude of the reentry vehicle, knowledge of reentry vehicle-probe altitude separation is not sufficient. An absolute altitude reference point for one of the bodies must be established with this point being obtained by using ground impact of the probe at which instant probe altitude is zero, with the altitude of the reentry vehicle being equal to the altitude separation between the probe and reentry vehicle.

Accordingly, a primary object of the instant invention is to provide a novel terrain-clearance type of fuzing system.

Another object is to provide a novel air burst fuzing system which permits the advantages of both inertial and radar fuzing systems to be combined in a single integrated mechanism.

Still another object is to provide a terrain referenced fuzing system utilizing a directed one way communication so as to eliminate ground reflectivity attenuation.

A further object is to provide a terrain referenced fuzing system utilizing an extremely short duration radiating period thereby giving defense systems virtually no time to lock on for jamming purposes.

A still further object is to provide a novel fuzing system in which a probe is released from a reentry vehicle and is caused to impact at the time when the reentry vehicle is above its desired height of burst, and upon impact of the probe a signal is transmitted from the probe to cause arming of the reentry vehicle. In addition this same signal causes arming of additional reentry vehicles launched in conjunction with the reentry vehicle launched with the probe.

These as well as other objects of this invention will become readily apparent after reading the following description of the accompanying drawings in which:

FIGURE 3 is a side elevation of a probe and reentry vehicle secured together.

FIGURE 4 is an enlarged longitudinal cross-section of the means securing the probe to the reentry vehicle.

FIGURE 5 is a longitudinal cross-section of the probe.

FIGURES 6A through 6H show a sequence of operational events which take place from the time the reentry vehicle and probe separate from the missile propulsion system to the time when the separation distance between the probe and reentry vehicle begins to increase.

FIGURE 7 is a block diagram illustrating the transmitting system of the probe.

FIGURE 8 is a block diagram illustrating the receiving system of the reentry vehicle which receives transmission from the probe.

Figure 1:
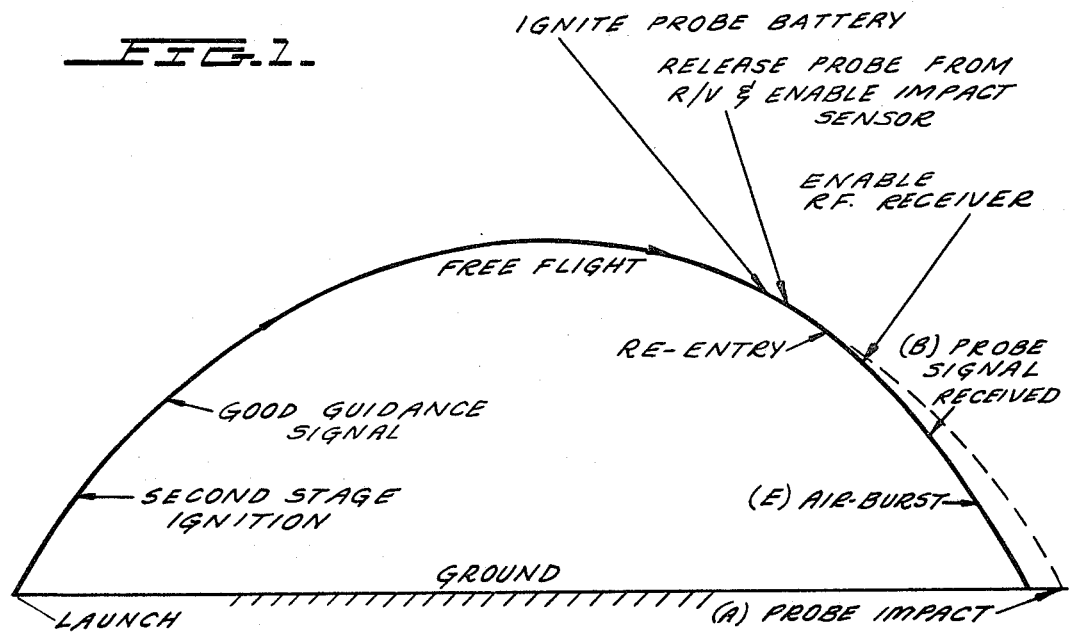
FIGURE 1 is a diagram showing a typical trajectory for a missile constructed in accordance with the teachings of the instant invention.

Now referring to the figures and more particularly to FIGURE 3 which partially illustrates missile 10 including rear section 11 containing the propulsion system used for launching. Mounting means 12 removably secures reentry vehicle 13, hereinafter referred to as "R/V," to the forward end of section 11 in axial alignment therewith. Additional mounting means 14, including separation straps 15, 16 separably secures probe 20 to the forward end of R/V 13 in axial alignment therewith. Warhead 17 is disposed within R/V 13. The ballistic coefficient of probe 20 is considerably greater than the ballistic coefficient of R/V 13 for a reason to be hereinafter explained. Typically, the ballistic coefficient of probe 20 is 3000 pounds per square foot while the ballistic coefficient of R/V 13 is 1500 pounds per square foot.

As best seen in FIGURES 3, 4 and 6G, in addition to straps 15 and 16, securing means 14 includes three arcuate fairing strips 18 each extending for 120° about the common axis 19 of probe 20 and R/V 13 as a center and are positioned so as to form a cylinder. The forward ends of fairing strips 18 are provided with inwardly projecting formations 22 which extend into the under-cut formation at the rear of probe 20, while inward projections 23 at the rear of fairing strips 18 extend into the circular groove of mounting ring 24 carried by R/V 13 near the forward end thereof. Ring 24 is constructed of material which will rapidly ablate after reentry of R/V 13. Wiring harness 25 extends parallel to axis 19 and is positioned within the cylinder formed by fairing strips 18 with one end of harness 25 being electrically connected to probe 20 by connector 27.

FIGURES 6A through 6H illustrate the sequence of events which take place after R/V 13 with probe 20 secured thereto is separated from missile propulsion system 11. More particularly, following separation of R/V 13 from propulsion system 11 (FIGURE 6A) the pitch and depitch rockets of R/V 13 are ignited to angularly orient R/V 13 with respect to the trajectory path (FIGURES 6B and 6C), and is spun-up by igniting the spin rockets of R/V 13 (FIGURE 6D). Since probe 20 and R/V 13 are symmetrically positioned with respect to the same axis 19, probe 20 experiences the same dynamic motions that are imposed on R/V 13. In addition, mounting of probe 20 along the axis 19 of R/V 13 imparts the proper orientation and angular momentum to probe 20 for greater stabiilty upon reentry.

Thereafter but prior to reentry, signals transmitted from R/V 13 through electronic harness 25 reach probe 20 and securing means 14. One of these signals ignites thermal battery 31 within probe 20 (FIGURE 6E) and thereafter another one of these signals fires power cartridge squibs (not shown) which open straps 15, 16 to release fairing strips 18 (FIGURE 6F). Centrifugal forces developed by the rotation of mounting means 14, together with probe 20 and R/V 13, eject fairing strips 18 radially away from axis 19 (FIGURE 6G). At reentry, probe 20 separates from R/V 13 is a result of their different aero dynamic properties (FIGURE 6H) with probe 20 moving ahead of R/V 13 and the separation between them increasing until probe 20 impacts.

Figure 2:
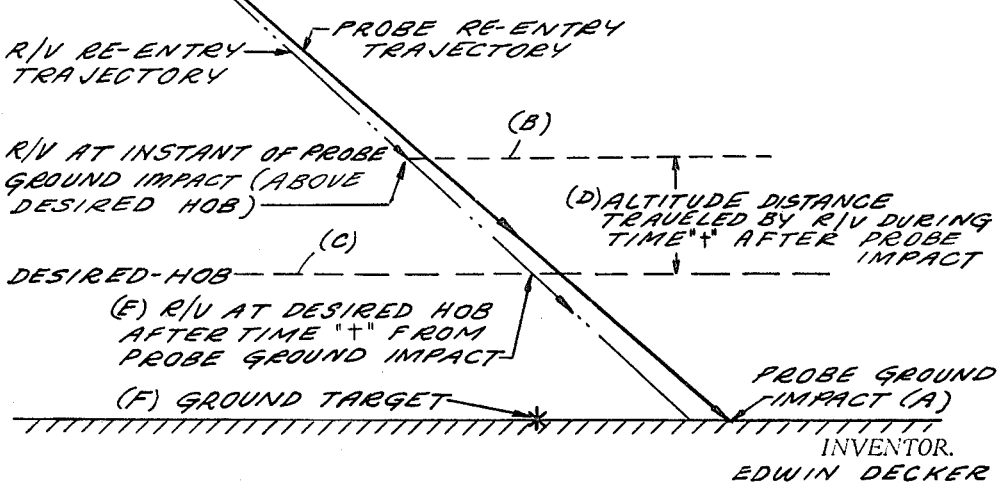
FIGURE 2 is an enlargement of that portion of the missile trajectory of FIGURE 1 between reentry and ground.

Since probe 20 experiences less drag than R/V 13 the reentry trajectory for probe 20 (broken line of FIGURE 1 and solid line of FIGURE 2) moves further away from the launch point (FIGURE 1) than the reentry trajectory of R/V 13 (broken line of FIGURE 2). At the time of probe ground impact at point A, R/V 13 is at altitude B. Altitude B is separated from the desired height of burst (C) hereinafter referred to as HOB, by altitude distance D as will be explained in greater detail. Impact of probe 20 causes the transmission of a signal to R/V 13 with receipt of this signal initiating operation of a timing device which, after an interval $t$, generates a command signal for firing of warhead 17. The firing of warhead 17 takes place at point E at the desired HOB C over ground target F.

Probe 20 is a slender conical member whose outer shell 61 is a heat shield. Shield 61 is lined with insulation 62 which surrounds ballast 63 disposed within shell 61 forward of the sensor and transmitter package 40 of FIGURE 7.

As seen in FIGURES 5 and 8, sensor-transmitter package 40 of probe 20 is provided with circularly polarized transmitting antenna 41 centered on axis 19 and positioned so as to radiate from the rear of probe 20. Antenna 41 receives the signal to be transmitted thereby from magnetron 42 whose heater supply is energized by thermal battery 31. When probe 20 strikes the ground the shock generated activates impact pulse transmitter 43 including a magnetized ferromagnetic core 44 having a coil (not shown) wound around one leg thereof. The shock wave disorients the magnetic moments, de-magnetizes the core, and thereby reduces the magnetic flux from the initial value to zero. Thus, there is a large change in flux in a relatively short time interval to produce a pulse the duration of which depends upon the length of the core in the direction of the shock wave. This is explained in the March 1958 issue of The Journal of Applied Physics, vol. 29, No. 3, pp. 500 and 501. The pulse produced by the de-magnetization of coil 44 triggers magnetron 42 into transmitting a short pulse typically of two microseconds duration. Pulse current regulator 45 is interposed between pulse generator 43 and magnetron 42 in order to minimize frequency shift due to pulling. Except for this short duration pulse, radio silence is maintained.

R/V 13 is provided with a super heterodyne type of receiver illustrated in block diagram form in FIGURE 8. This receiver includes circularly polarized flush surface slot-like antenna 51 having a typical gain of 8 db and a 3 db beam width of approximately 20°. Waveguide 52 provides for mode change from circular to rectangular polarization with the output of waveguide 52 feeding mixer 53. Local oscillator 54 also feeds mixer 53 with the latter beating the signals from waveguide 52 and oscillator 54 to produce an output fed to IF amplifier 55 having a log response. The output of amplifier 55 is fed to decision circuits 56 which operate in conjunction with timing mechanism 57 to produce an output which initiates operation of start burst timer 58. A predetermined time interval after operation of timer 58 is initiated a command signal is generated thereby to fire warhead 17.

Since the exact configuration of decision circuits 56 are not part of the instant invention and may be built by techniques known to the art, it is sufficient for purposes of this application to note that decision circuits 56 will only pass pulses during an expected time interval (ETI) as derived from timing mechanism 57. If a pulse is between 1½ and 2½ microseconds in duration and is received during the ETI gate of one second, decision circuits 56 will initiate operation of start burst timer 58. Pulses which do not occur during the ETI gate or which are less than 1.5 microseconds in duration will be rejected by decision circuits 56. The presence of more than one pulse within the ETI gate will cause all pulses to be rejected. Pulses in excess of 2½ microseconds will also be rejected. If decision circuits 56 detect a train of pulses or the presence of a continuous wave jamming signal, and if these signals do not saturate the receiver circuits, then the threshold level will be shifted so that a pulse from probe 20 will still have a high probability of detection and will cause start burst timer 58 to operate.

Thus, it is seen that the instant invention provides a novel structure as well as a novel method for obtaining accurate height of burst fuzing by means which is essentially jam proof.

While the instant invention has been described by considering a single reentry vehicle operating in conjunction with a transmitting probe launched therewith, it should now be apparent to those skilled in the art that a signal transmitted from a single probe may be used to control firing of a plurality of warheads carried by different reentry vehicles launched as part of a program including the launching of the reentry vehicle carrying the transmitting probe. The warheads of all reentry vehicles may be detonated simultaneously or in a programmed sequence either to provide greater over pressure at a target or to cover a broader area than is possible with a single reentry vehicle.

It is also noted that while the probe-transmitter described is one that is actuated by probe impact, it is also within contemplation of this invention that probe transmission can be initiated in accordance with other conditions such as proximity, rather than impact, with the ground. It is further noted that for some applications it may be desirable to impart a differential velocity to the probe relative to the reentry vehicle prior to reentry.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows.

I claim:

1. A missile including a vehicle, a probe and fastening means separably securing said probe to said vehicle; said probe having a higher ballistic coefficient than said vehicle; said probe including a device for generating a transmitted signal after separation of said probe from said vehicle; said vehicle including apparatus for detecting said transmitted signals and generating a command signal in response to detection of said transmitted signal; means for releasing said fastening means prior to said vehicle reaching the reentry portion of a trajectory reaching into outer space.

2. A missile as in claim 1 in which the device for generating the transmitted signal is impact actuated.

3. A missile as in claim 1 in which the fastening means secures the probe and the vehicle in axial alignment.

4. A missile as in claim 3 in which the fastening means is centered about the axis for said probe and said vehicle, said fastening means constructed of separable sections, means for releasing said fastening means by moving said separable sections radially outward from said axis.

5. A method of controlling height of burst for a missile having a vehicle containing a warhead, said method including the steps of launching the missile with a probe of greater ballistic coefficient than said vehicle connected to said vehicle on a common trajectory extending into outer space, separating the probe from the vehicle during the downward portion of their common trajectory at a point prior to reentry, thereafter transmitting a signal from said probe to said vehicle, and exploding said warhead in response to receipt of said signal by said vehicle.

6. The method as set forth in claim 5 in which the signal is transmitted upon impact of the probe.

7. The method as set forth in claim 5 in which exploding of the warhead is delayed for a predetermined time interval after receipt of said signal by said vehicle.

8. The method as set forth in claim 7 in which the signal is a short duration pulse generated at a point in time controlled by probe position relative to terrain.

9. A method of controlling height of burst for a missile having a vehicle containing a warhead, said method including the steps of launching the missile with a probe of greater ballistic coefficient than said vehicle connected to said vehicle, separating the probe from the vehicle during the downward portion of their common trajectory, thereafter transmitting a signal from said probe to said vehicle, exploding said warhead in response to receipt of said signal by said vehicle, launching an additional missile, having a vehicle containing a warhead, in predetermined time relation to launching of the other missile, and exploding the warhead of the additional missile in response to receipt of said signal by the vehicle of the additional missile.

References Cited

UNITED STATES PATENTS

| | | | |
|---|---|---|---|
| 2,293,817 | 8/1942 | Gruver | 102—7.4 |
| 2,845,027 | 7/1958 | Aiken | 102—70.2 X |
| 3,086,467 | 4/1963 | Gallagher et al. | 244—3.1 |
| 3,139,033 | 6/1964 | Geissler et al. | 244—3.1 X |
| 3,157,122 | 11/1964 | Laurent et al. | 102—49 |

BENJAMIN A. BORCHELT, *Primary Examiner.*

W. C. ROCH, T. H. WEBB, *Assistant Examiners.*